(12) United States Patent
Spirkó et al.

(10) Patent No.: US 11,202,179 B2
(45) Date of Patent: Dec. 14, 2021

(54) MONITORING AND ANALYZING COMMUNICATIONS ACROSS MULTIPLE CONTROL LAYERS OF AN OPERATIONAL TECHNOLOGY ENVIRONMENT

(71) Applicant: Accenture Global Solutions Limited, Dublin (IE)

(72) Inventors: Miklós Spirkó, Budapest (HU); Attila Bálint, Mórahalom (HU); István Sági, Budapest (HU); Istvan Palinkas, Godollo (HU); Éva Lászka, Budapest (HU); Claus Friedl, Tuerkenfeld (DE); László Kiss, Orbottyan (HU)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/809,255

(22) Filed: Mar. 4, 2020

(65) Prior Publication Data

US 2021/0195384 A1 Jun. 24, 2021

Related U.S. Application Data

(60) Provisional application No. 62/952,980, filed on Dec. 23, 2019.

(51) Int. Cl.
*H04W 4/12* (2009.01)
*H04L 29/06* (2006.01)
(Continued)

(52) U.S. Cl.
CPC .......... *H04W 4/12* (2013.01); *H04L 65/1006* (2013.01); *H04L 67/02* (2013.01); *H04L 69/22* (2013.01); *H04W 4/08* (2013.01); *H04W 88/184* (2013.01)

(58) Field of Classification Search
CPC ....... H04W 4/08; H04W 4/12; H04W 88/184; H04L 65/1006; H04L 67/02; H04L 69/22
(Continued)

(56) References Cited

U.S. PATENT DOCUMENTS 7,290,056 B1 * 10/2007 McLaughlin, Jr. .......................... H04L 43/0852 709/201
10,931,602 B1 * 2/2021 Matthews ............. H04L 47/625
(Continued)

FOREIGN PATENT DOCUMENTS

| EP | 2852097 A1 * | 3/2015 | ............. H04L 43/04 |
|---|---|---|---|
| EP | 2852097 A1 | 3/2015 | |
| WO | 2014128463 A1 | 8/2014 | |

OTHER PUBLICATIONS

Extended European Search Report for Application No. EP20161275.1, dated Sep. 21, 2020, 8 pages.

*Primary Examiner* — Frantz B Jean
(74) *Attorney, Agent, or Firm* — Harrity & Harrity, LLP

(57) ABSTRACT

A device may obtain a set of communication messages, wherein the set of communication messages is associated with communications between a plurality of operational technology (OT) devices across a plurality of OT control layers of an OT environment. The device may determine whether each communication message, of the set of communication messages, is a request message or a response message and thereby determine whether at least one communication message has a communication message match. The device may generate, based on determining whether the at least one communication message has a communication match, one or more communication entries, wherein a communication entry, of the one or more communication entries, includes message header information of a request message of the set of communication messages. The device
(Continued)

may cause, based on the one or more communication entries, one or more actions to be performed.

20 Claims, 11 Drawing Sheets

(51) Int. Cl.
    *H04L 29/08* (2006.01)
    *H04W 4/08* (2009.01)
    *H04W 88/18* (2009.01)
(58) Field of Classification Search
    USPC ............................................... 370/329
    See application file for complete search history.

(56) References Cited

U.S. PATENT DOCUMENTS

| | | | |
|---|---|---|---|
| 2018/0270229 A1* | 9/2018 | Zhang | H04W 12/06 |
| 2018/0343238 A1* | 11/2018 | Tola | H04L 9/14 |
| 2019/0020683 A1* | 1/2019 | Haerterich | H04L 63/1491 |
| 2019/0098113 A1* | 3/2019 | Park | G06F 16/9024 |
| 2019/0182368 A1* | 6/2019 | Tang | H04L 41/12 |
| 2020/0145816 A1* | 5/2020 | Morin | H04W 12/12 |

\* cited by examiner

MONITORING AND ANALYZING COMMUNICATIONS ACROSS MULTIPLE CONTROL LAYERS OF AN OPERATIONAL TECHNOLOGY ENVIRONMENT

RELATED APPLICATION

This application claims priority to U.S. Provisional Patent Application No. 62/952,980, filed on Dec. 23, 2019, and entitled "MONITORING AND ANALYZING COMMUNICATIONS ACROSS MULTIPLE CHANNELS OF AN OPERATIONAL TECHNOLOGY ENVIRONMENT," the content of which is incorporated by reference herein in its entirety.

BACKGROUND

An operational technology (OT) environment may be used to drive, control, and/or monitor processes involved with one or more plant operations (e.g., manufacturing operations). An OT environment may interconnect one or more devices and/or systems, such as programmable logic controllers, supervisory control and data acquisition systems, distributed control systems, process control domains, safety systems, management and automation systems, and/or the like.

SUMMARY

According to some implementations, a method may include receiving, by a device, a plurality of communication messages, wherein the plurality of communication messages is communicated between a plurality of operational technology (OT) devices across a plurality of OT control layers of an OT environment; causing, by the device, the plurality of communication messages to be stored in a first data structure; identifying, by the device, a set of communication messages stored in the first data structure; determining, by the device, whether each communication message, of the set of communication messages, is a request message or a response message; identifying, by the device and based on determining whether each communication message is a request message or a response message, at least one communication message pair, wherein a communication message pair comprises a request message and a response message that is a response to the request message; generating, by the device and based on determining the at least one communication message pair, one or more communication entries, wherein a communication entry, of the one or more communication entries, includes respective message header information of a request message and a response message that comprise a communication message pair; causing, by the device, the one or more communication entries to be stored in a second data structure; and causing, by the device and based on the one or more communication entries, one or more actions to be performed.

According to some implementations, a device may include one or more memories; and one or more processors, communicatively coupled to the one or more memories, configured to: obtain a set of communication messages, wherein the set of communication messages is associated with communications between a plurality of OT devices across a plurality of OT control layers of an OT environment; determine whether each communication message, of the set of communication messages, is a request message or a response message; determine, based on determining whether each communication message is the request message or the response message, whether at least one communication message has a communication message match; generate, based on determining whether the at least one communication message has a communication match, one or more communication entries, wherein a communication entry, of the one or more communication entries, includes message header information of a request message of the set of communication messages; and cause, based on the one or more communication entries, one or more actions to be performed.

According to some implementations, a non-transitory computer-readable medium may store one or more instructions. The one or more instructions, when executed by one or more processors of a device, may cause the one or more processors to: obtain a set of communication messages from a first data structure, wherein the set of communication messages is associated with communications between a plurality of OT devices of an OT environment; determine whether each communication message, of the set of communication messages, is a request message or a response message; determine, whether a respective response message exists that is a response to each request message of the set of communication messages; generate, based on determining whether a respective response message exists that is a response to each request message of the set of communication messages, one or more communication entries, wherein a particular communication entry, of the one or more communication entries, includes message header information of a particular request message and additional information associated with the particular request message; cause the one or more communication entries to be stored in a second data structure; and cause, based on the one or more communication entries, one or more actions to be performed.

DETAILED DESCRIPTION

Figure 1A:
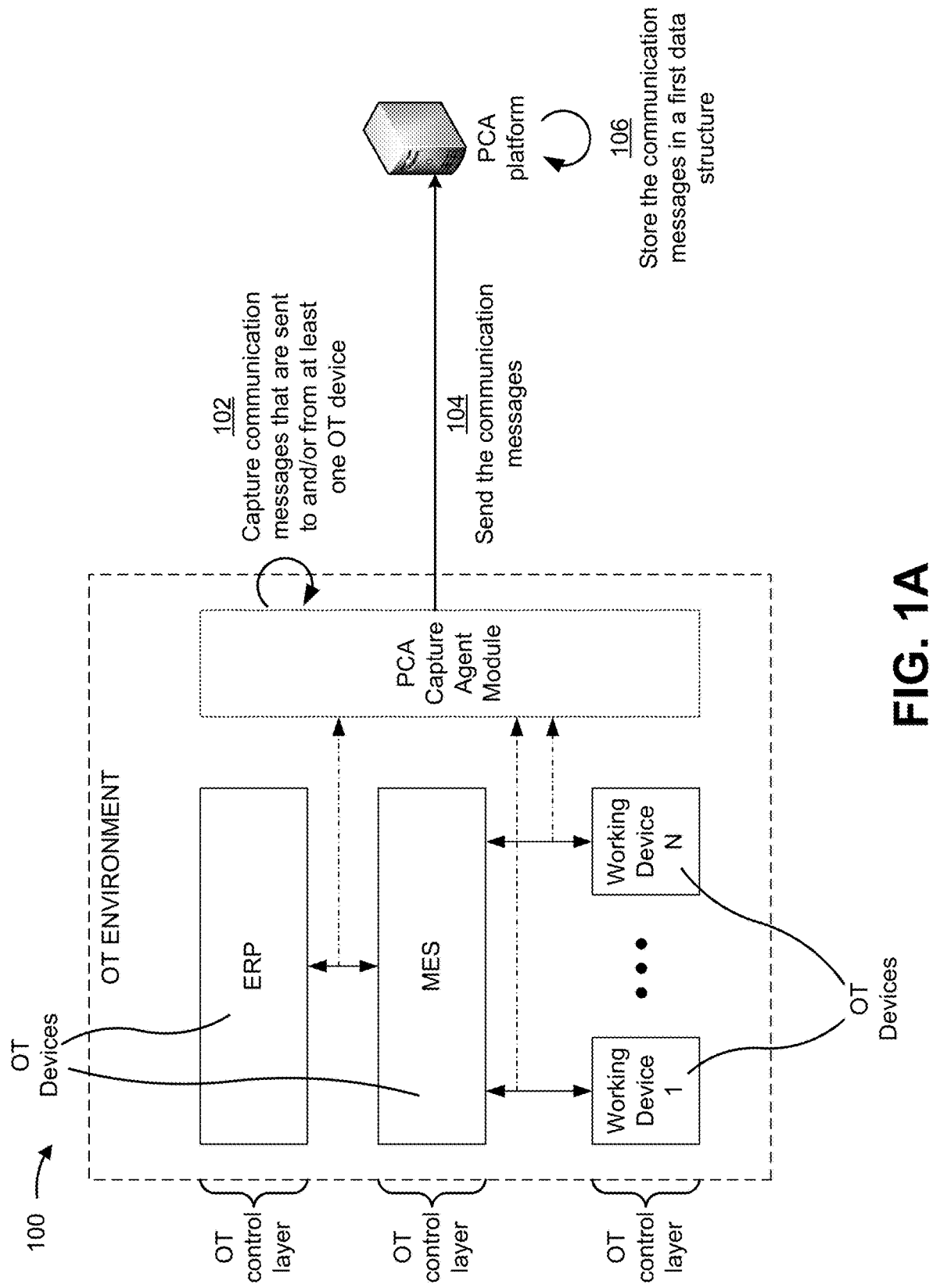
FIGS. 1A-1D are diagrams of one or more example implementations described herein.

The following detailed description of example implementations refers to the accompanying drawings. The same reference numbers in different drawings may identify the same or similar elements.

An operational technology (OT) environment may include numerous working devices (e.g., pumps, valves, sensors, machines, robots, and/or the like), control devices (e.g., supervisory control and data acquisition (SCADA) devices, programmable logic control (PLC) devices, distributed control devices, human-machine interface (HMI) devices, and/or the like), manufacturing execution system (IVIES) devices, enterprise resource planning system (ERP) devices, and/or the like, each respectively associated with a particular OT control layer. Unfortunately, data acquired, consolidated, communicated, and/or the like by one or more devices at one OT control layer may not be accessible and/or readable by one or more devices at another OT control layer. In many cases, this makes monitoring of communications across multiple layers of the OT environment impossible, which consumes computing resources (e.g., processing resources, memory resources, communication resources, and/or the like) and/or network resources to maintain, troubleshoot, and/or repair the OT environment in an inefficient manner.

Some implementations described herein provide a plant communication analytics (PCA) platform that enables monitoring and visualization of communications across OT control layers (e.g., between working devices, control devices, IVIES devices, ERP devices, and/or the like) of an OT environment. In some implementations, the PCA platform may identify a set of communication messages (e.g., communicated between a plurality of OT devices across a plurality of OT control layers of the OT environment). In some implementations, the PCA platform may process the set of communication messages to identify request messages and response messages. In some implementations, the PCA platform may identify one or more communication message pairs (e.g., where each communication message pair comprises a request message and a response message that is a response to the request message) and may generate one or more communication entries based on the one or more communication message pairs. In some implementations, a communication entry may include respective message header information of a request message and a response message (e.g., that form a communication pair), a time delay associated with the request message and the response message, and a communication status associated with the request message and the response message. In some implementations, the PCA platform may cause, based on the one or more communication entries, one or more actions to be performed, such as causing the one or more communication entries to be displayed (e.g., on a display of a client device), determining a communication issue affecting at least one OT device and generating one or more instructions to address the communication issue, and/or the like.

In this way, the PCA platform automatically captures, consolidates, and/or analyzes communications across one or more OT control layers of an OT environment and presents relevant information that facilitates identifying a communication issue that affects operation of the OT environment. Moreover, the PCA platform, in some implementations, automatically and efficiently addresses the identified communication issue, thereby facilitating maintaining, troubleshooting, and/or repairing the OT environment. Thus, the PCA platform may conserve computing resources (e.g., processing resources, memory resources, communication resources, and/or the like) and/or networking resources that would have otherwise been used to identify and/or address an issue that affects the OT environment in a less efficient manner.

FIGS. 1A-1D are diagrams of one or more example implementations 100 described herein. As shown in FIGS. 1A-1D, example implementation(s) 100 may include a plurality of OT devices in an OT environment, a plant communication analytics (PCA) platform, and/or a client device. In some implementations, at least one OT device, the PCA platform, and/or the client device may be connected via a network, such as a wired network (e.g., the Internet or another data network), a wireless network (e.g., a wireless local area network, a wireless wide area network, a cellular network, and/or the like), and/or the like.

The PCA platform may be a computing device, a server device, a cloud computing device, and/or the like. The client device may be a communication and/or computing device, such as a mobile phone, a smartphone, a laptop computer, a tablet computer, and/or the like. An OT device, of the plurality of OT devices, may be a working device (e.g., a pump, a valve, a sensor, a machine, a robot, and/or the like), a control device (e.g., a supervisory control and data acquisition (SCADA) device, a programmable logic control (PLC) device, a distributed control device, a human-machine interface (HMI) device, and/or the like), a manufacturing execution system (MES) device, an enterprise resource planning system (ERP) device, and/or the like. Each OT device may be associated with a particular OT control layer of the OT environment. For example, as shown in FIG. 1A, the plurality of OT devices may include a plurality of working devices (e.g., shown as working devices 1 through N, where N is greater than or equal to 2) associated with a first OT control layer (e.g., a bottom level control layer), an MES device associated with a second OT control layer (e.g., a middle level control layer), and an ERP device associated with a third OT control layer (e.g., a top level control layer).

In some implementations, a communication channel may exist between two or more OT devices (e.g., for the two or more OT devices to transmit communication messages to each other). For example, as shown in FIG. 1A, the ERP device may communicate with the MES device via a communication channel, the working device 1 may communicate with the MES device via a communication channel, and the working device N may communicate with the MES device via a communication channel. A communication channel may span OT control layers to allow OT devices from different OT control layers to communicate with each other.

In some implementations, at least one OT device may include a PCA capture agent module. The PCA capture agent module may be an open platform communications unified architecture (OPC UA) client, an MQ telemetry transport (MQTT) client, and/or the like. The at least one OT device may use the PCA capture agent module to capture communications that are sent to and/or transmitted from the at least one OT device (e.g., to capture communication messages that designate the at least one OT device as an origin OT device or a destination OT device). For example, the MES device may include a PCA capture agent module that is configured to capture communication messages that are sent to and/or from the MES device. As another example, each working device may include a respective PCA capture agent module that is configured to capture respective communication messages sent to and/or from the working device.

As shown by reference number 102, at least one OT device (e.g., using the PCA capture agent of the at least one OT device) may capture a plurality of communication messages that are sent to and/or from the at least one OT device. In some implementations, the at least one OT device (e.g., using the PCA capture agent of the at least one OT device) may monitor, scan, and/or the like one or more communication channels of the at least one OT device to capture the plurality of communication messages. For example, the MES device (e.g., using a PCA capture agent included in the MES device) may monitor the communication channel between the MES device and the ERP device, the communication channel between the MES device and the working device 1, the communication channel between the MES device and the working device N, and/or the like to capture communication messages sent to and/or from the MES device. Additionally, or alternatively, the at least one OT device (e.g., using the PCA capture agent of the at least one OT device) may monitor, scan, and/or the like a data structure associated with the at least one OT device to capture the plurality of communication messages. For example, the at least one OT device (e.g., using the PCA capture agent of the at least one OT device) may monitor a file directory associated with the at least one OT device where communication messages are stored (e.g., cached, archived, and/or the like). In this way, the at least one OT device (e.g., using the PCA capture agent of the at least one OT device) may capture a plurality of communication messages communicated between the plurality of OT devices across the plurality of OT control layers of the OT environment.

A communication message may be a transmission control protocol (TCP) telegram (e.g., a TCP telegram that conforms to the request for comments (RFC) 1006 standard), an extensible markup language (XML) telegram, a raw ethernet telegram, an OPC UA telegram, an OPC classic telegram, and/or the like. For example, RFC 1006 TCP telegrams may be communicated between the MES device and the plurality of working devices. As another example, XML telegrams may be communicated between the MES device and the plurality of working devices and/or between the MES device and the ERP device.

A communication message may include message header information and/or communication data. The message header information may include information concerning a time of transmission of the communication message; information identifying a work operation associated with the communication message (e.g., a work operation, such as to create a product, that is to be performed or has been performed by a working device); information identifying an origin OT device (e.g., the OT device that sent the communication message); information identifying a destination OT device (e.g., the OT device to receive the communication message); information indicating a name, an identifier, and/or a type of the communication message; information indicating a length of the communication message (e.g., in bits or bytes); information indicating a running number of the communication message (e.g., a transmission sequence number); information indicating an event code of the communication message (e.g., information indicating how or why the communication message was generated); and/or the like. When the communication message is communicated between the ERP device and MES device, the communication data may include information concerning at least one material (e.g., that is used to create a product), information concerning at least one order (e.g., at least one order to create, manufacture, and/or the like the product), and/or the like. The information concerning the at least one material may include information indicating a name, an identifier, or a type of the at least one material; information indicating a traceability scope of the at least one material (e.g., information indicating how the at least one material is tracked by the ERP device); information indicating a procedure type of the at least one material (e.g., information indicating whether the at least one material is manufactured internally or externally); and/or the like. The information concerning the at least one order may include information indicating a name, an identifier, or a type of the at least one order; information indicating a size, quantity, and/or the like of the at least one order; information identifying one or more work operations associated with the at least one order; and/or the like. When the communication message is communicated between the MES device and a working machine (e.g., a working machine of working machines 1-N), the communication data may include information concerning a product, which may include information indicating a name, an identifier, or a type of the product; information indicating a size, quantity, and/or the like of the product; information identifying a status of one or more work operations associated with the product; and/or the like.

As shown by reference number 104, the at least one OT device (e.g., using the PCA capture agent of the at least one OT device) may send the plurality of communication messages to the PCA platform. As shown by reference number 106, the PCA platform may store the plurality of communication messages in a first data structure (e.g., a first data structure included in the PCA platform and/or accessible to the PCA platform). Additionally, or alternatively, the at least one OT device (e.g., using the PCA capture agent of the at least one OT device) may directly send the plurality of communication messages to the first data structure (e.g., without sending the communications data to the PCA platform) to cause the first data structure to store the plurality of communication messages in the first data structure.

Figure 1B:
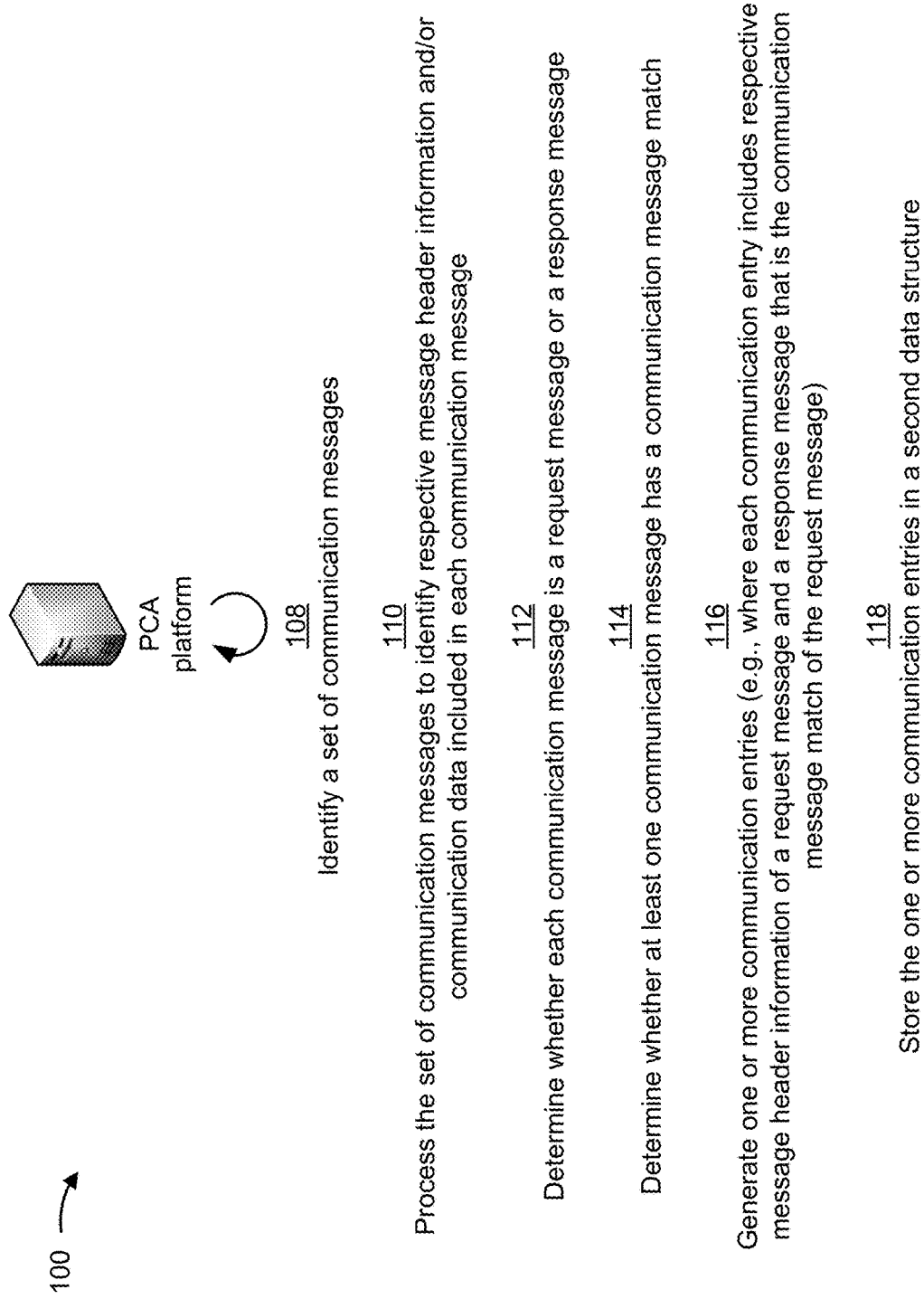

As shown in FIG. 1B and by reference number 108, the PCA platform may identify a set of communication messages stored in the first data structure (e.g., one or more communication messages stored in the first data structure that have not been previously identified and/or processed by the PCA platform as described herein, one or more communication messages that were stored in the first data structure during a particular time period (e.g., the last five seconds), and/or the like). In some implementations, the PCA platform may process the set of communication messages to normalize the set of communication messages (e.g., to prepare different types of communication messages for further processing, as described herein). As shown by reference number 110, the PCA platform may process (e.g., parse) the set of communication messages to identify the respective message header information and/or communication data included in each communication message, of the set of communication messages.

As shown by reference number 112, the PCA platform may process the message header information of each communication message to determine whether the communication message is a request message or a response message. For example, the PCA platform may determine that a communication message is a request message or a response message based on the information indicating the name, the identifier, or the type of the communication message included in the message header information of the communication message (e.g., the type of the communication message is a request-type communication message or a response-type communication message).

As shown by reference number 114, the PCA platform may determine whether at least one communication message, of the set of communication messages, has a communication message match and, thereby, may identify at least one communication message pair. For example, the PCA platform may determine that a request message matches with a response message (e.g., the response message is a response to the request message) and/or that a response message matches with a request message (e.g., the request message triggered generation of the response message). When a request message matches with a response message (or the response message matches with the request message), the PCA platform may identify the request message and the response message as part of a communication message pair.

In some implementations, to determine that a request message has a communication message match, the PCA platform may identify and/or determine (e.g., based on the message header information of the request message) that the request message was sent from a first OT device to a second OT device. The PCA platform may process the response messages of the set of communication messages (e.g., process the respective message header information of the response messages) to identify one or more response messages that were sent from the second OT device to the first OT device. The PCA platform may identify and/or determine that a particular response message, of the one or more response messages, is a response message to the request message (e.g., when at least some message header information of the particular response message correlates with at least some message header information associated with the request message). For example, the PCA platform may determine that the particular response message is the response message to the request message when the message header information of the particular response message and the message header information of the request message include information identifying the same work operation. As another example, the PCA platform may determine that the particular response message is the response message to the request message when the message header information of the particular response message and the message header information of the request message indicate that the particular response message was transmitted after the request message (e.g., within a threshold amount of time after the request message was transmitted).

Additionally, or alternatively, the PCA platform may determine that a request message does not have a communication message match. For example, the PCA platform may determine that no response message, of the one or more response messages, has at least some message header information that correlates with at least some message header information associated with the request message.

In some implementations, to determine that a response message has a communication message match, the PCA platform may identify and/or determine (e.g., based on the message header information of the response message) that the response message was sent from a first OT device to a second OT device. The PCA platform may process the request messages of the set of communication messages (e.g., process the respective message header information of the request messages) to identify and/or determine one or more request messages that were sent from the second OT device to the first OT device. The PCA platform may identify and/or determine that a particular request message, of the one or more request messages, is a request message that triggered generation of the response message when at least some message header information of the particular request message correlates with at least some message header information associated with the response message. For example, the PCA platform may determine that the particular request message is the request message that triggered generation of the response message when the message header information of the particular request message and the message header information of the response message include information identifying the same running number. As another example, the PCA platform may determine that the particular request message is the request message that triggered generation of the response message when the message header information of the particular request message and the message header information of the response message indicate that the particular request message was transmitted before the response message (e.g., within a threshold amount of time before the response message was transmitted).

Additionally, or alternatively, the PCA platform may determine that a response message does not have a communication message match. For example, the PCA platform may determine that no request message, of the one or more request messages, has at least some message header information that correlates with at least some message header information associated with the response message.

As shown by reference number 116, the PCA platform may generate one or more communication entries (e.g., one communication entry for each request message of the set of communication messages). A communication entry may include message header information of a request message. Additionally, or alternatively, the communication entry may also include (e.g., when the request message has a communication message match) message header information of a response message that is the communication message match of the request message (e.g., a response message that is a response the request message). In this way, the communication entry may include respective message header information of a request message and a response message that comprise a communication message pair. In some implementations, the communication entry may include the respective communication data of the request message and the response message.

In some implementations, the PCA platform may determine, based on the respective message header information of the request message and the response message, a time of transmission of the request message and a time of transmission of the response message. The PCA platform may compare the time of transmission of the request message and the time of transmission of the response message (e.g., determine a difference between the time of transmission of the request message and the time of transmission of the response message) to determine a time delay associated with the request message and/or the response message. The PCA platform may include the response time in the communication entry (e.g., to cause the communication entry to include the message header information of the request message, the message header information of the response message, and the time delay associated with the request message and the response message).

In some implementations, the PCA platform may identify and/or determine at least one communication status associated with the request message and/or the response message. For example, the PCA platform may determine (e.g., when the request message does not have a communication message match and/or message header information associated with a response message has not been included in the communication entry) an "unmatched" communication status. Additionally, or alternatively, the PCA platform may determine (e.g., when the request message has a communication message match and/or message header information associated with a response message has been included in the communication entry) a "matched" communication status. As another example, the PCA platform may determine (e.g., when the time delay associated with the request message and/or the response message satisfies (e.g., is greater than or equal to) a threshold, such as five seconds) a "communication delayed" status. Additionally, or alternatively, the PCA platform may determine (e.g., when the time delay associated with the request message and/or the response message does not satisfy (e.g., is less than) the threshold) a "communication on-time" status.

In another example, the PCA platform may determine (e.g., when information indicating an event code in the message header information of the request message indicates that the request message has a warning or error event code) a "request message warning or error" communication status. Additionally, or alternatively, the PCA platform may determine (e.g., when information indicating an event code in the message header information of the request message indicates that the request message has no warning or error event code) a "request message OK" communication status. As another example, the PCA platform may determine (e.g., when information indicating an event code in the message header information of the response message indicates that the response message has a warning or error event code) a "response message warning or error" communication status. Additionally, or alternatively, the PCA platform may determine (e.g., when information indicating an event code in the message header information of the response message indicates that the response message has no warning or error event code) a "response message OK" status.

In an additional example, the PCA platform may determine, by comparing the lengths (e.g., in bits, bytes, and/or the like) of the respective message header information of the request message and the response message, whether the message header information of the request message is equal in length to the message header information of the response message. The PCA platform may determine an "equal length" communication status when the message header information of the request message is equal in length to the message header information of the response message and an "unequal length" status when the message header information of the request message is not equal in length to the message header information of the response message (e.g., which may indicate an error for RFC 1006 TCP telegrams). In another example, the PCA platform may determine, when no other status of the communication entry has been identified and/or determined by the PCA platform, an "OK" communication status.

In some implementations, the PCA platform may include one or more of the communication statuses identified and/or determined by the PCA platform (e.g., as described above) in the communication entry (e.g., to cause the communication entry to include the message header information of the request message, the message header information of the response message, and at least one communication status).

As shown by reference number 118, the PCA platform may store the one or more communication entries in a second data structure (e.g., a second data structure included in the PCA platform and/or accessible to the PCA platform). Additionally, or alternatively, the PCA platform may send the communication information to the second data structure to cause the second data structure to store the communication information in the second data structure.

Figure 1C:
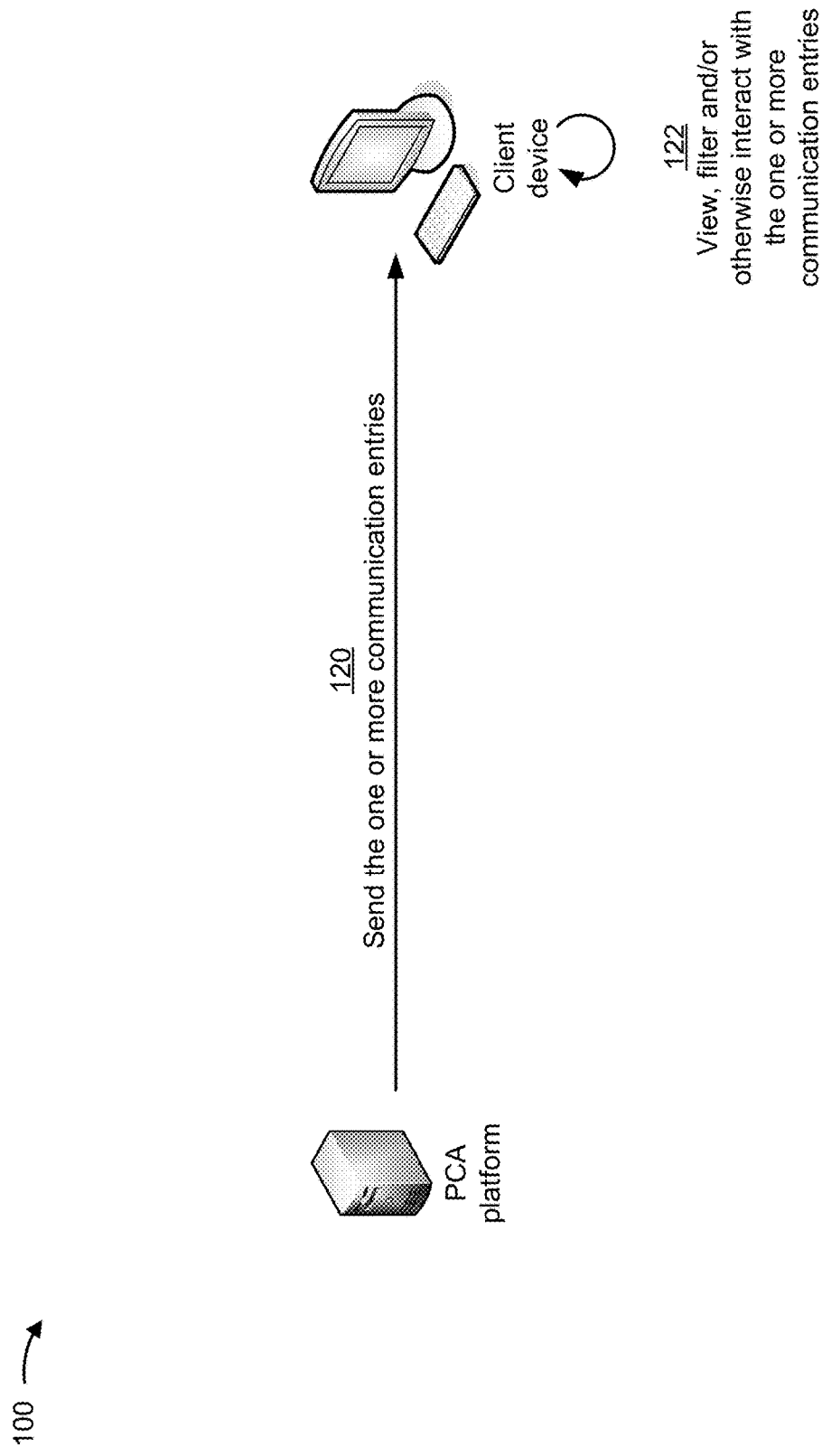

As shown in FIG. 1C and by reference number 120, the PCA platform may send the one or more communication entries to the client device and/or may cause the one or more communication entries to be sent from the second data structure to the client device. For example, the PCA platform may send a report (e.g., a real-time report, a historical report, and/or the like regarding the one or more communication entries) to the client device (e.g., to allow the client device to display the report on a display of the client device).

In some implementations, the PCA platform may provide a user interface that enables the one or more communication entries to be displayed on a display of the client device. As shown by reference number 122, a user of the client device may interact with an input interface of the client device (e.g., a keyboard, a mouse, a touchscreen, and/or the like) to view, filter, and/or otherwise interact with the one or more communication entries. For example, the PCA platform may provide the one or more communication entries via a web interface to the client device that provides a dashboard for the user of the client device to interact with the one or more communication entries. A communication entry may be selected via the web interface, which may cause the request message and/or the response message associated with the communication entry to be retrieved from the second data structure and displayed via the web interface.

Figure 1D:
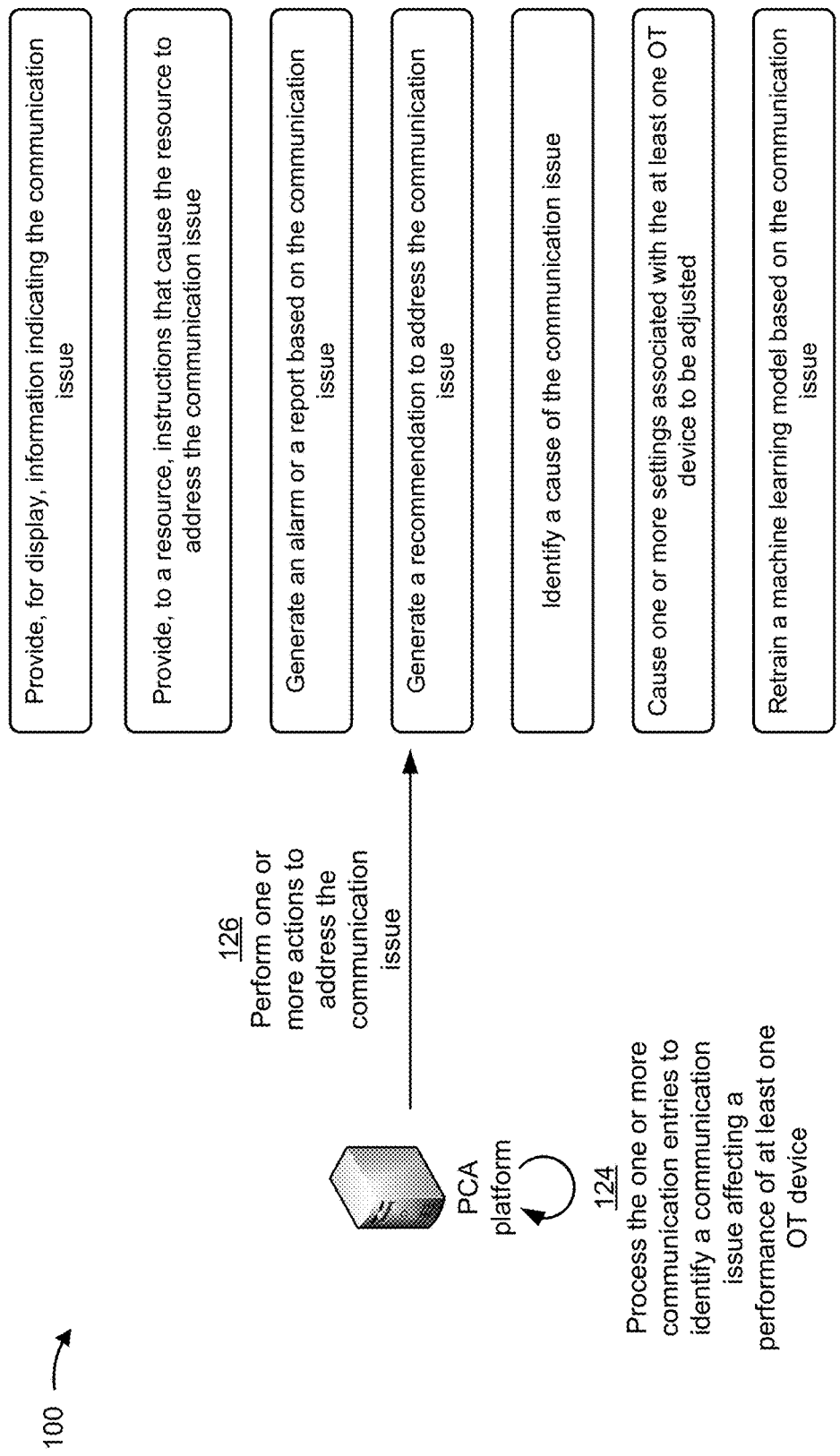

As shown in FIG. 1D and by reference number 124, the PCA platform may process the one or more communication entries to identify a communication issue affecting a performance of at least one OT device. For example, the PCA platform may identify a set of communication entries, of the one or more communication entries, that are associated with a particular OT device and that have a negative communication status (e.g., an unmatched communication status, a communication delayed communication status, a request message warning or error communication status, a response message warning or error communication status, an unequal length communication status, and/or the like). The PCA platform may compare the set of communication entries to a second set of communication entries, of the one or more communication entries, that are associated with the particular OT device that have a positive communication status (e.g., a matched communication status, a communication on-time communication status, an equal length communication status, an OK communication status, and/or the like) to determine a communication issue affecting a performance of the at least one OT device (e.g., a physical communication connection issue, a non-physical communication connection issue (e.g., the at least one OT device is overloaded, non-responsive, and/or the like), a physical component issue, and/or the like of the at least one OT device).

In some implementations, the PCA platform may process the one or more communication entries using a machine learning model to identify whether a communication issue is affecting a performance of at least one OT device and an action to take to improve the performance. In some implementations, the PCA platform may train the machine learning model based on one or more parameters respectively associated with the one or more communication entries, such as message header information of a request message included in communication entry, message header information of a response message included in the communication entry, a time delay associated with the request message and the response message included in the communication entry, at least one communication status associated with the request message and/or the response message included in the communication entry, and/or the like. The PCA platform may train the machine learning model using historical data associated with the one or more communication entries, historical data associated with one or more determinations regarding whether a communication issue is affecting a performance of at least one OT device, historical data associated with actions that were taken to remedy past issues, and/or the like. Using the historical data and the one or more parameters as inputs to the machine learning model, the PCA platform may identify whether a communication issue is affecting a performance of at least one OT device and provide one or more recommendations for addressing the performance issue. The machine learning model may be trained and/or used in a similar manner to that described below with respect to FIGS. 2 and 3.

As shown by reference number 126, the PCA platform may perform one or more actions to address the communication issue. In some implementations, the one or more actions may include the PCA platform providing, for display (e.g., on the display of the client device), information indicating the communication issue. In this way, the PCA platform may alert individuals responsible for managing the at least one OT device, and the individuals may address the communication issue.

In some implementations, the one or more actions may include the PCA platform generating one or more instructions to address the communication issue and providing, to a resource (e.g., the at least one OT device, the client device, and/or the like), the one or more instructions that cause the resource to execute the one or more instructions to address the communication issue. In this way, the PCA platform may facilitate automatically address the communication issue.

In some implementations, the one or more actions may include the PCA platform generating an alarm based on the communication issue (e.g., when the communication issue is a critical communication issue). For example, the PCA platform may activate a light of the client device, may output a sound via a speaker of the client device, and/or the like. This may alert individuals responsible for managing the at least one OT device that a critical communication issue has occurred that may affect functionality of the at least one OT device.

In some implementations, the one or more actions may include the PCA platform generating a recommendation based on the communication issue. For example, the PCA platform may generate a recommendation to address the communication issue, and may provide information for display, in a message to the client device, and/or the like, that identifies the recommendation. In this way, the PCA platform may provide the recommendation to individuals responsible for managing resource usage, and the individuals may address the communication issue.

In some implementations, the one or more actions may include the PCA platform identifying a cause of the communication issue. For example, by processing the one or more communication entries using a machine learning model, the PCA platform may be capable of identifying a communication issue and a source of the communication issue. The PCA platform may be able to determine (e.g., using the machine learning model) what settings, connections, environment conditions, and/or the like of the OT device caused the source of the communication issue to occur.

In some implementations, the one or more actions may include the PCA platform causing one or more settings associated with the at least one OT device to be adjusted. For example, the PCA platform may send instructions to the at least one OT device that causes the at least one OT device to adjust the one or more settings.

In some implementations, the one or more actions may include the PCA platform retraining the machine learning model based on the communication issue. In this way, the machine learning model may better predict communication issues associated with one or more OT devices of the OT environment.

As indicated above, FIGS. 1A-1D are provided as one or more examples. Other examples may differ from what is described with regard to FIGS. 1A-1D. The number and arrangement of devices and/or platforms shown in FIGS. 1A-1D are provided as one or more examples. In practice, there may be additional devices and/or platforms, fewer devices and/or platforms, different devices and/or platforms, or differently arranged devices and/or platforms than those shown in FIGS. 1A-1D. Furthermore, two or more devices and/or platforms shown in FIGS. 1A-1D may be implemented within a single device and/or platform, or a single device and/or platform shown in FIGS. 1A-1D may be implemented as multiple, distributed devices and/or platforms. Additionally, or alternatively, a set of devices and/or platforms (e.g., one or more device and/or platform) of FIGS. 1A-1D may perform one or more functions described as being performed by another set of devices and/or platforms of FIGS. 1A-1D.

Figure 2:
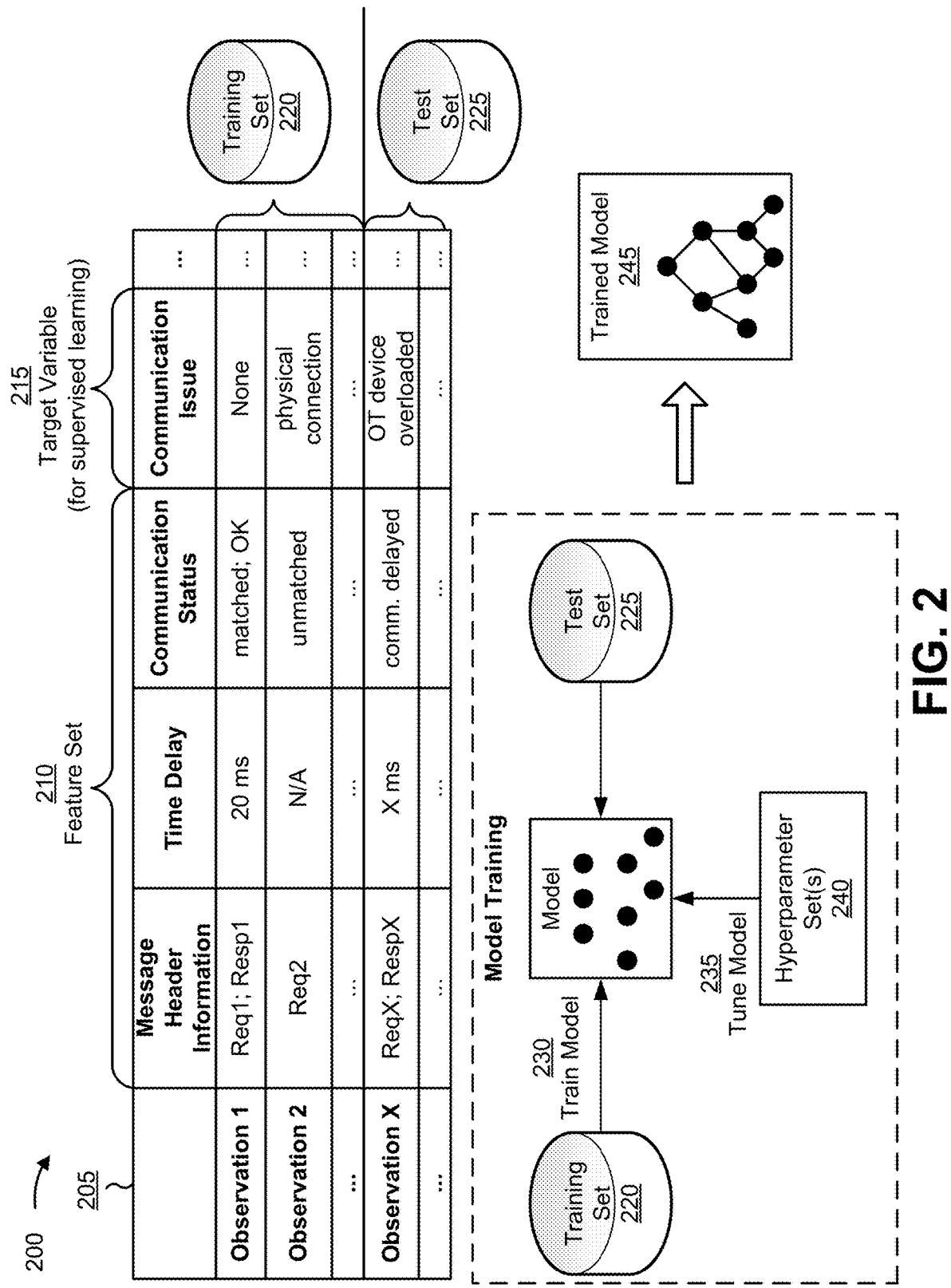
FIGS. 2 and 3 are diagrams of another one or more example implementations described herein.

FIG. 2 is a diagram illustrating an example 200 of training a machine learning model. The machine learning model training described herein may be performed using a machine learning system. The machine learning system may include at least one OT device, a client device, a PCA platform, and/or the like.

As shown by reference number 205, a machine learning model may be trained using a set of observations. The set of observations may be obtained and/or input from historical data, such as data gathered during one or more processes described herein. For example, the set of observations may include data gathered from generating and processing communication entries, as described elsewhere herein. In some implementations, the machine learning system may receive the set of observations (e.g., as input) from the at least one OT device, the client device, the PCA platform, and/or the like.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the at least one OT device, the client device, the PCA platform, and/or the like. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the at least one OT device, the client device, the PCA platform, and/or the like, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of message header information of a request message and/or message header information of a response message, a second feature of a time delay associated with the request message and the response message, a third feature of at least one communication status associated with the request message and/or the response message, and so on. As shown, for a first observation, the first feature may include message header information for a first request message (e.g., Req1) and message header information of a first response message (e.g., Resp1), the second feature may have a value of 20 milliseconds, the third feature may have a value of a matched communication status and an OK communication status, and so on. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value (e.g., a communication issue affecting a performance of at least one OT device) that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/ or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
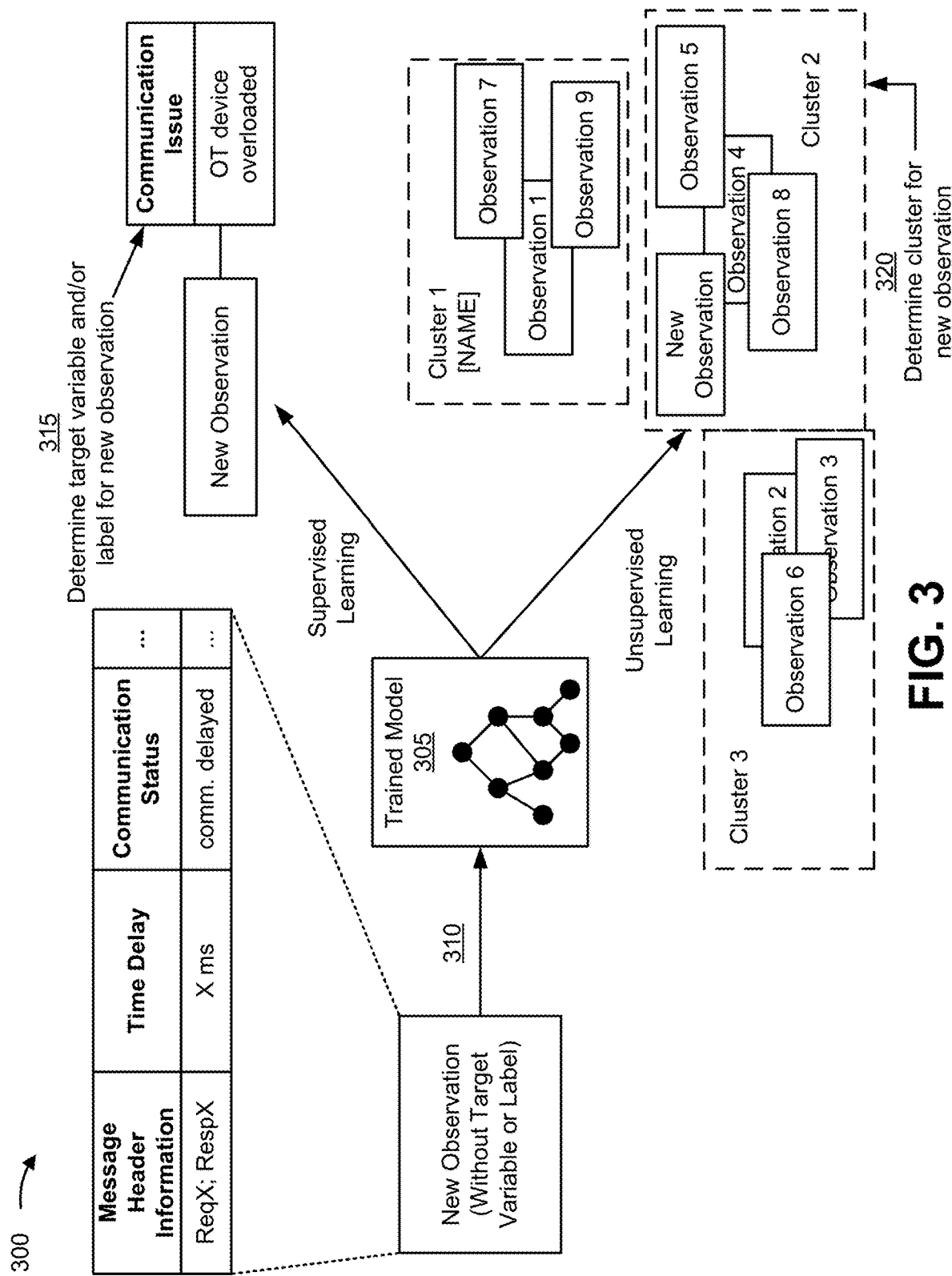

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include at least one OT device, a client device, a PCA platform, and/or the like.

As shown by reference number 310, the machine learning system may receive a new observation (or a set of new observations), and may input the new observation to the machine learning model 305. As shown, the new observation may include a first feature of message header information of a request message and/or message header information of a response message, a second feature of a time delay associated with the request message and the response message, a third feature of at least one communication status associated with the request message and/or the response message, and so on. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of "OT device overloaded" for the target variable of a communication issue affecting a performance of an OT device for the new observation, as shown by reference number 315. Based on this prediction (e.g., based on the value having a particular label/classification, based on the value satisfying or failing to satisfy a threshold, and/or the like), the machine learning system may provide a recommendation, such as adjusting one or more settings associated with the at least one OT device. Additionally, or alternatively, the machine learning system may perform an automated action and/or may cause an automated action to be performed (e.g., by instructing another device to perform the automated action), such as generating one or more instructions to address the communication issue and/or cause another device, such as the at least one OT device, to execute the one or more instructions to perform one or more operations to address the communication issue. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a particular cluster, as shown by reference number 320. The observations within a cluster may have a threshold degree of similarity. Based on classifying the new observation in the particular cluster, the machine learning system may provide a recommendation, such as adjust one or more settings associated with the at least one OT device. Additionally, or alternatively, the machine learning system may perform an automated action and/or may cause an automated action to be performed (e.g., by instructing another device to perform the automated action), such as generating one or more instructions to address the communication issue and/or cause another device, such as the at least one OT device, to execute the one or more instructions to perform one or more operations to address the communication issue.

In this way, the machine learning system may apply a rigorous and automated process to determine whether a communication issue is affecting a performance of at least one OT device. The machine learning system enables recognition and/or identification of tens, hundreds, thousands, or millions of features and/or feature values for tens, hundreds, thousands, or millions of observations, thereby increasing an accuracy and consistency of determining whether a communication issue is affecting a performance of at least one OT device relative to requiring computing resources to be allocated for tens, hundreds, or thousands of operators to manually determine whether a communication issue is affecting a performance of at least one OT device using the features or feature values.

As indicated above, FIG. 3 is provided as an example. Other examples may differ from what is described in connection with FIG. 3.

Figure 4:
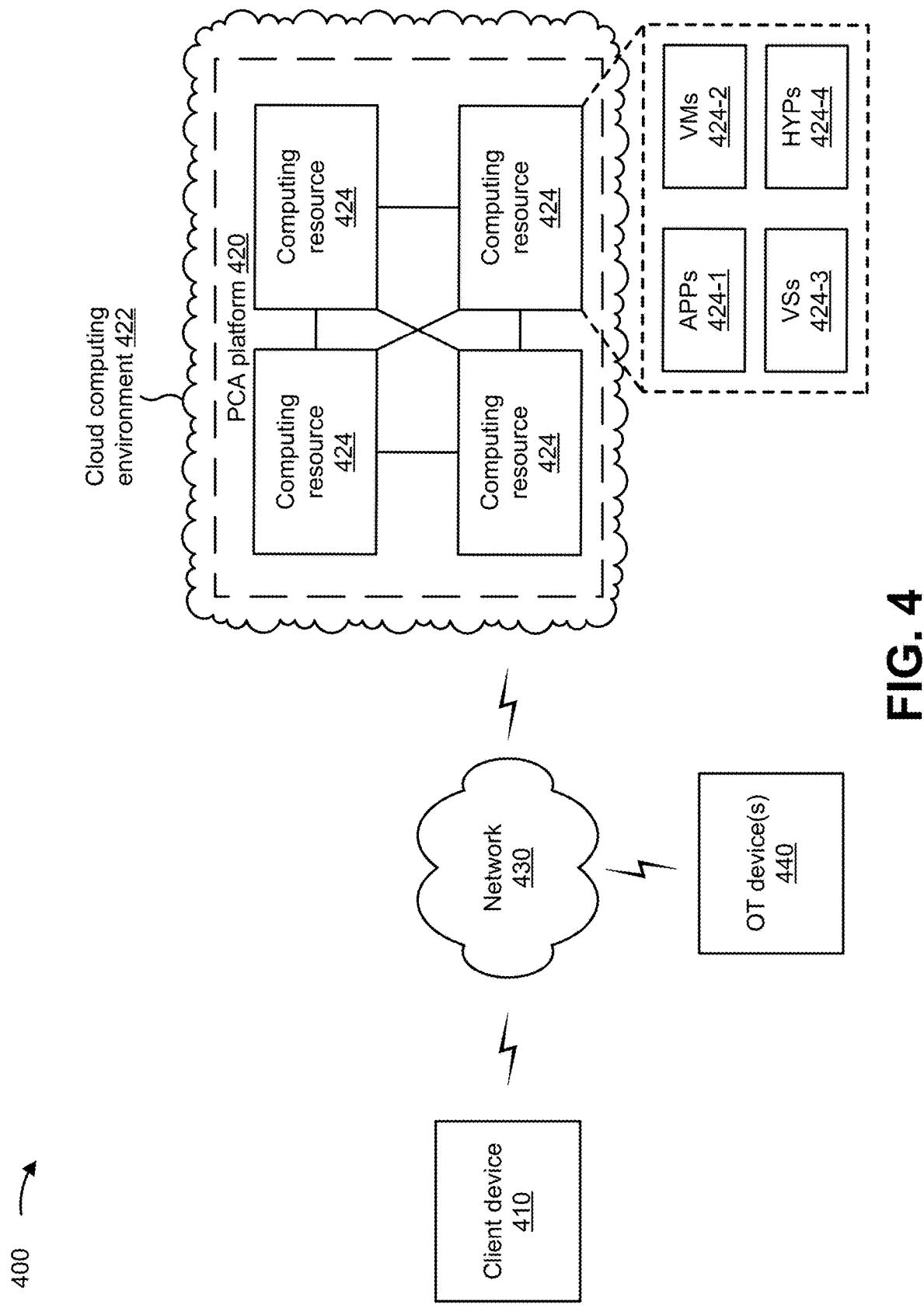
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a PCA platform 420, a network 430, and one or more OT devices 440 (referred to collectively as OT devices 440 and singularly as OT device 440). Devices of environment 400 may interconnect via wired connections, wireless connections, or a combination of wired and wireless connections.

Client device 410 includes one or more devices capable of receiving, generating, storing, processing, and/or providing information, such as information described herein. For example, client device 410 may receive information from and/or transmit information to PCA platform 420. In some implementations, client device 410 may include a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a global positioning system (GPS) device, a server device, a personal computer, or a similar type of device.

PCA platform 420 includes one or more devices that process and/or analyze communications messages associated with OT device 440 to determine and/or generate communication entries. In some implementations, PCA platform 420 may be modular, such that certain software components may be swapped in or out depending on a particular need. As such, PCA platform 420 may be easily and/or quickly reconfigured for different uses. In some implementations, PCA platform 420 may receive information from and/or transmit information to one or more client devices 410 and/or one or more OT devices 440.

In some implementations, as shown, PCA platform 420 may be hosted in a cloud computing environment 422. Notably, while implementations described herein describe PCA platform 420 as being hosted in cloud computing environment 422, in some implementations, PCA platform 420 may not be cloud-based (i.e., may be implemented outside of a cloud computing environment) or may be partially cloud-based.

Cloud computing environment 422 includes an environment that may host PCA platform 420. Cloud computing environment 422 may provide computation, software, data access, storage, etc., services that do not require end-user knowledge of a physical location and configuration of one or more systems and/or devices that PCA platform 420. As shown, cloud computing environment 422 may include a group of computing resources 424 (referred to collectively as "computing resources 424" and individually as "computing resource 424").

Computing resource 424 includes one or more personal computers, workstation computers, server devices, or other types of computation and/or communication devices. In some implementations, computing resource 424 may host PCA platform 420. Cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, and/or the like.

Application 424-1 includes one or more software applications that may be provided to or accessed by client device 410. Application 424-1 may eliminate a need to install and execute the software applications on client device 410. For example, application 424-1 may include software associated with PCA platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system. A process virtual machine may execute a single program, and may support a single process. In some implementations, virtual machine 424-2 may execute on behalf of a user (e.g., client device 410 or an operator of PCA platform 420), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

OT device 440 includes one or more devices capable of receiving, generating, storing, processing, and/or providing information, such as information described herein. For example, OT device 440 may receive information from and/or transmit information to PCA platform 420. In some implementations, OT device 440 may include a working device, a control device, a MES device, an ERP device, and/or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
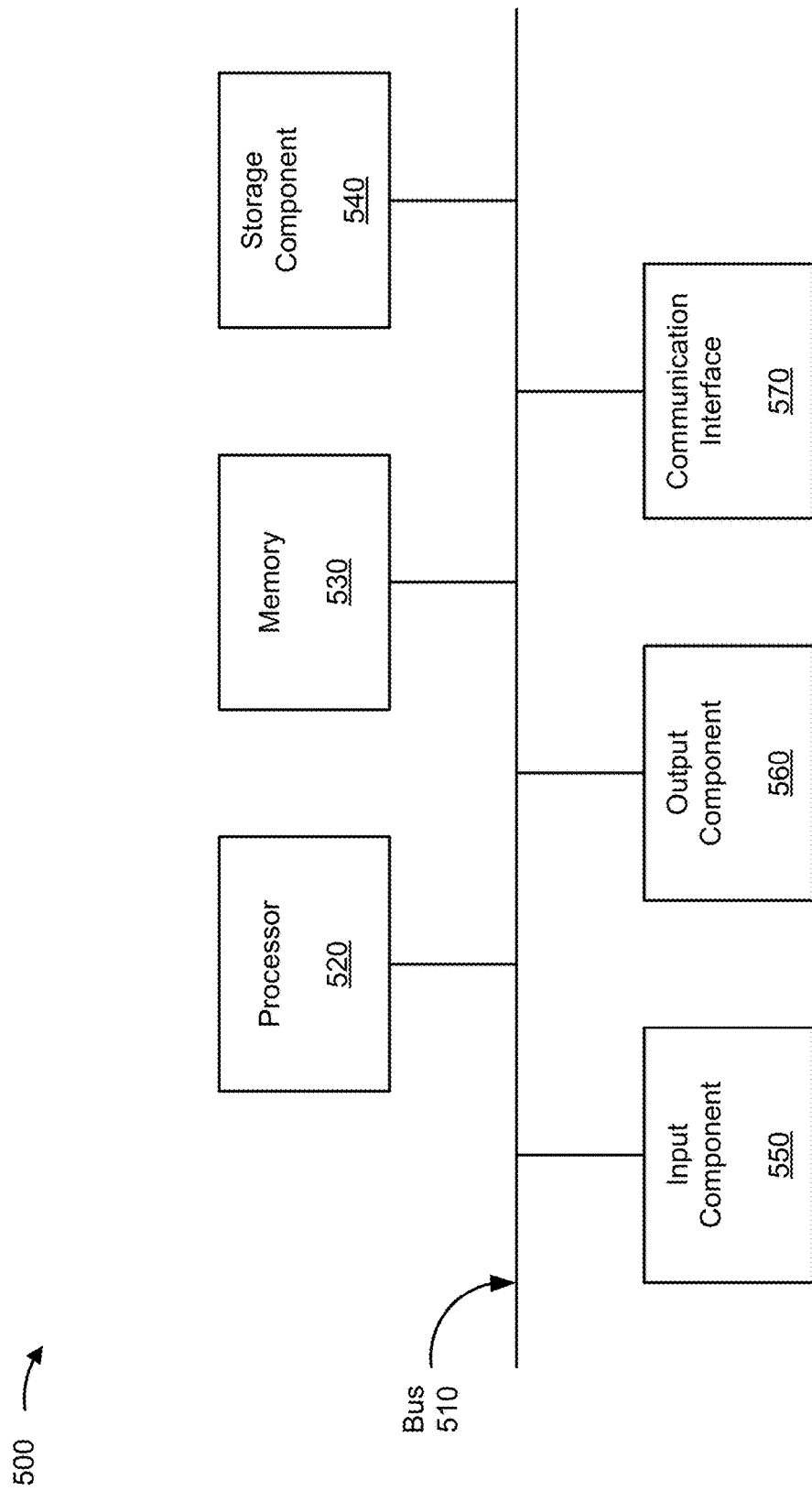
FIG. 5 is a diagram of example components of one or more devices of FIG. 4.

FIG. 5 is a diagram of example components of a device 500. Device 500 may correspond to client device 410, PCA platform 420, computing resource 424, and/or OT device 440. In some implementations, client device 410, PCA platform 420, computing resource 424, and/or OT device 440 may include one or more devices 500 and/or one or more components of device 500. As shown in FIG. 5, device 500 may include a bus 510, a processor 520, a memory 530, a storage component 540, an input component 550, an output component 560, and/or a communication interface 570.

Bus 510 includes a component that permits communication among multiple components of device 500. Processor 520 is implemented in hardware, firmware, and/or a combination of hardware and software. Processor 520 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 520 executing software instructions stored by a computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
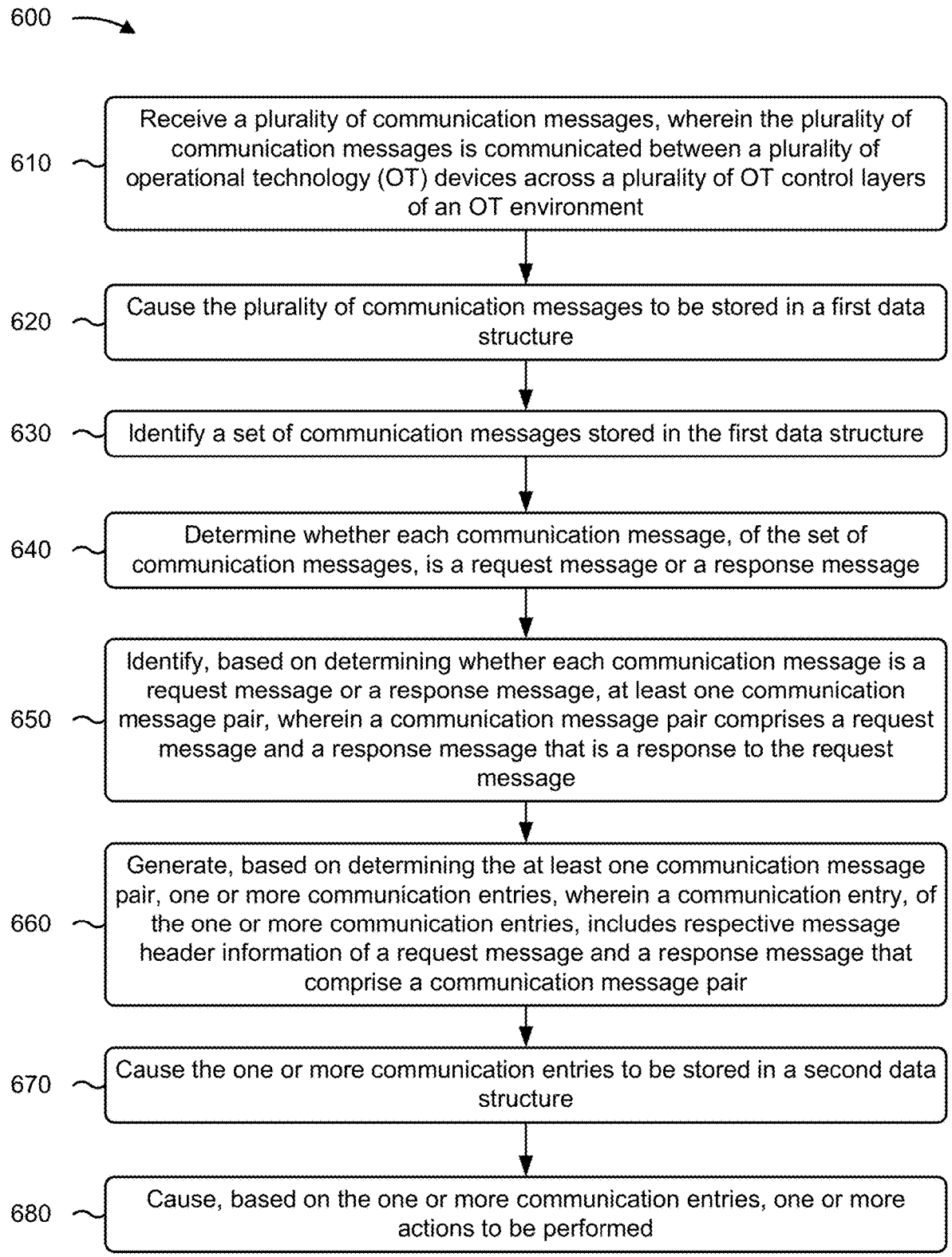
FIGS. 6-8 are flowcharts of example processes for monitoring and analyzing communications across multiple control layers of an OT environment.

FIG. 6 is a flowchart of an example process 600 for monitoring and analyzing communications across multiple control layers of an OT environment. In some implementations, one or more process blocks of FIG. 6 may be performed by a PCA platform (e.g., PCA platform 420). In some implementations, one or more process blocks of FIG. 6 may be performed by another device or a group of devices separate from or including the PCA platform, such as a client device (e.g., client device 410), an OT device 440, and/or the like.

As shown in FIG. 6, process 600 may include receiving a plurality of communication messages, wherein the plurality of communication messages is communicated between a plurality of operational technology (OT) devices across a plurality of OT control layers of an OT environment (block 610). For example, the PCA platform (e.g., computing resource 424, processor 520, memory 530, storage component 540, input component 550, output component 560, communication interface 570, and/or the like) may receive a plurality of communication messages, as described above. In some implementations, the plurality of communication messages is communicated between a plurality of operational technology (OT) devices across a plurality of OT control layers of an OT environment.

As further shown in FIG. 6, process 600 may include causing the plurality of communication messages to be stored in a first data structure (block 620). For example, the PCA platform (e.g., computing resource 424, processor 520, memory 530, storage component 540, input component 550, output component 560, communication interface 570, and/or the like) may cause the plurality of communication messages to be stored in a first data structure, as described above.

As further shown in FIG. 6, process 600 may include identifying a set of communication messages stored in the first data structure (block 630). For example, the PCA platform (e.g., computing resource 424, processor 520, memory 530, storage component 540, input component 550, output component 560, communication interface 570, and/or the like) may identify a set of communication messages stored in the first data structure, as described above.

As further shown in FIG. 6, process 600 may include determining whether each communication message, of the set of communication messages, is a request message or a response message (block 640). For example, the PCA platform (e.g., computing resource 424, processor 520, memory 530, storage component 540, input component 550, output component 560, communication interface 570, and/or the like) may determine whether each communication message, of the set of communication messages, is a request message or a response message, as described above.

As further shown in FIG. 6, process 600 may include identifying, based on determining whether each communication message is a request message or a response message, at least one communication message pair, wherein a communication message pair comprises a request message and a response message that is a response to the request message (block 650). For example, the PCA platform (e.g., computing resource 424, processor 520, memory 530, storage component 540, input component 550, output component 560, communication interface 570, and/or the like) may identify, based on determining whether each communication message is a request message or a response message, at least one communication message pair, as described above. In some implementations, a communication message pair comprises a request message and a response message that is a response to the request message.

As further shown in FIG. 6, process 600 may include generating, based on determining the at least one communication message pair, one or more communication entries, wherein a communication entry, of the one or more communication entries, includes respective message header information of a request message and a response message that comprise a communication message pair (block 660). For example, the PCA platform (e.g., computing resource 424, processor 520, memory 530, storage component 540, input component 550, output component 560, communication interface 570, and/or the like) may generate, based on determining the at least one communication message pair, one or more communication entries, as described above. In some implementations, a communication entry, of the one or more communication entries, includes respective message header information of a request message and a response message that comprise a communication message pair.

As further shown in FIG. 6, process 600 may include causing the one or more communication entries to be stored in a second data structure (block 670). For example, the PCA platform (e.g., computing resource 424, processor 520, memory 530, storage component 540, input component 550, output component 560, communication interface 570, and/or the like) may cause the one or more communication entries to be stored in a second data structure, as described above.

As further shown in FIG. 6, process 600 may include causing, based on the one or more communication entries, one or more actions to be performed (block 680). For example, the PCA platform (e.g., computing resource 424, processor 520, memory 530, storage component 540, input component 550, output component 560, communication interface 570, and/or the like) may cause, based on the one or more communication entries, one or more actions to be performed, as described above.

Process 600 may include additional implementations, such as any single implementation or any combination of implementations described below and/or in connection with one or more other processes described elsewhere herein.

In a first implementation, receiving the plurality of communication messages comprises receiving the plurality of communication messages from at least one OT device of the plurality of OT devices, wherein the at least one OT device includes a capture agent module to capture the plurality of communication messages communicated between the plurality of OT devices across the plurality of OT control layers of the OT environment.

In a second implementation, alone or in combination with the first implementation, the communication entry, of the one or more communication entries, further includes at least one of a time delay associated with the request message and the response message that are included in the communication entry; or at least one communication status associated with the request message and the response message that are included in the communication entry.

In a third implementation, alone or in combination with one or more of the first and second implementations, generating the one or more communication entries includes identifying a particular request message and a particular response message that comprise a particular communication message pair of the at least one communication pair; determining, based on the particular request message and the particular response message, a time delay associated with the particular request message and the particular response message; and generating a communication entry that includes message header information of the particular request message, message header information of the particular response message, and the time delay associated with the particular request message and the particular response message.

In a fourth implementation, alone or in combination with one or more of the first through third implementations, generating the one or more communication entries includes identifying a particular request message and a particular response message that comprise a particular communication message pair of the at least one communication pair; generating a communication entry that includes message header information of the particular request message and message header information of the particular response message; determining, based on an event code of the particular request message and an event code of the particular response message, at least one communication status associated with the particular request message and the particular response message; and causing the at least one communication status to be included in the communication entry.

In a fifth implementation, alone or in combination with one or more of the first through fourth implementations, a communication message, of the plurality of communication messages, includes message header information and communication data, and wherein the message header information includes at least one of information concerning a time of transmission of the communication message; information identifying a work operation associated with the communication message; information identifying an origin OT device; information identifying a destination OT device; information indicating a name of the communication message; information indicating an identifier of the communication message; information indicating a type of the communication message; information indicating a length of the communication message; information indicating a running number of the communication message; or information indicating an event code of the communication message.

In a sixth implementation, alone or in combination with one or more of the first through fifth implementations, a communication message, of the plurality of communication messages, includes message header information and communication data, and wherein the communication data includes at least one of information concerning at least one material used to create a product; information concerning at least one order to create the product; or information concerning creation of the product.

In a seventh implementation, alone or in combination with one or more of the first through sixth implementations, causing the one or more actions to be performed comprises sending the one or more communication entries to a client device to cause the one or more communication entries to be displayed.

In an eighth implementation, alone or in combination with one or more of the first through seventh implementations, causing the one or more actions to be performed comprises processing the one or more communication entries to identify a communication issue affecting a performance of at least one OT device, and causing one or more settings associated with the at least one OT device to be adjusted.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
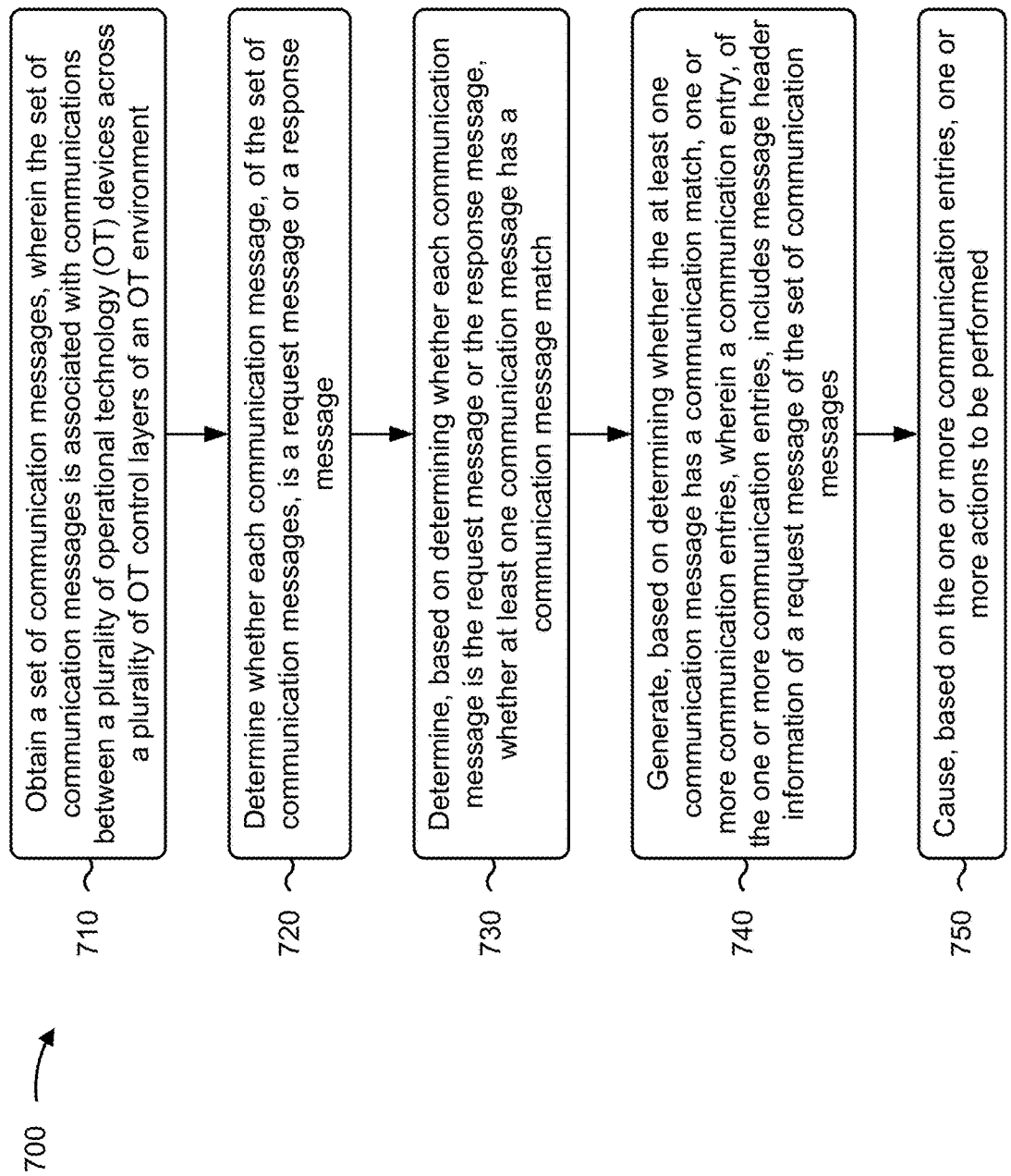

FIG. 7 is a flowchart of an example process 700 for monitoring and analyzing communications across multiple control layers of an OT environment. In some implementations, one or more process blocks of FIG. 7 may be performed by a PCA platform (e.g., PCA platform 420). In some implementations, one or more process blocks of FIG. 7 may be performed by another device or a group of devices separate from or including the PCA platform, such as a client device (e.g., client device 410), an OT device 440, and/or the like.

As shown in FIG. 7, process 700 may include obtaining a set of communication messages, wherein the set of communication messages is associated with communications between a plurality of operational technology (OT) devices across a plurality of OT control layers of an OT environment (block 710). For example, the PCA platform (e.g., computing resource 424, processor 520, memory 530, storage component 540, input component 550, output component 560, communication interface 570, and/or the like) may obtain a set of communication messages, as described above. In some implementations, the set of communication messages is associated with communications between a plurality of operational technology (OT) devices across a plurality of OT control layers of an OT environment.

As further shown in FIG. 7, process 700 may include determining whether each communication message, of the set of communication messages, is a request message or a response message (block 720). For example, the PCA platform (e.g., computing resource 424, processor 520, memory 530, storage component 540, input component 550, output component 560, communication interface 570, and/or the like) may determine whether each communication message, of the set of communication messages, is a request message or a response message, as described above.

As further shown in FIG. 7, process 700 may include determining, based on determining whether each communication message is the request message or the response message, whether at least one communication message has a communication message match (block 730). For example, the PCA platform (e.g., computing resource 424, processor 520, memory 530, storage component 540, input component 550, output component 560, communication interface 570, and/or the like) may determine, based on determining whether each communication message is the request message or the response message, whether at least one communication message has a communication message match, as described above.

As further shown in FIG. 7, process 700 may include generating, based on determining whether the at least one communication message has a communication match, one or more communication entries, wherein a communication entry, of the one or more communication entries, includes message header information of a request message of the set of communication messages (block 740). For example, the PCA platform (e.g., computing resource 424, processor 520, memory 530, storage component 540, input component 550, output component 560, communication interface 570, and/or the like) may generate, based on determining whether the at least one communication message has a communication match, one or more communication entries, as described above. In some implementations, a communication entry, of the one or more communication entries, includes message header information of a request message of the set of communication messages.

As further shown in FIG. 7, process 700 may include causing, based on the one or more communication entries, one or more actions to be performed (block 750). For example, the PCA platform (e.g., computing resource 424, processor 520, memory 530, storage component 540, input component 550, output component 560, communication interface 570, and/or the like) may cause, based on the one or more communication entries, one or more actions to be performed, as described above.

Process 700 may include additional implementations, such as any single implementation or any combination of implementations described below and/or in connection with one or more other processes described elsewhere herein.

In a first implementation, the set of communication messages is obtained from a first data structure, and causing the one or more actions to be performed includes causing the one or more communication entries to be stored in a second data structure; generating, based on the one or more communication entries, a report; and sending the report to a client device to allow the client device to display the report on a display of the client device.

In a second implementation, alone or in combination with the first implementation, determining whether the at least one communication message has a communication message match includes identifying a particular request message, of the set of communication messages, that was sent from a first OT device to a second OT device; identifying one or more response messages, of the set of communication messages, that were sent from the second OT device to the first OT device; identifying a particular response message, of the one or more response messages, that includes message header information that correlates with message header information of the particular request message; and determining that the particular response message is a communication message match for the particular request message based on identifying the particular response message that includes the message header information that correlates with the message header information of the particular request message.

In a third implementation, alone or in combination with one or more of the first and second implementations, determining whether at least one communication message has a communication message match includes identifying a particular request message, of the set of communication messages, that was sent from a first OT device to a second OT device; identifying one or more response messages, of the set of communication messages, that were sent from the second OT device to the first OT device; and determining that no particular response message, of the one or more response messages, includes message header information that correlates with message header information of the particular request message; and determining that the particular request message does not have a communication message match based on determining that no particular response message, of the one or more response messages, includes the message header information that correlates with the message header information of the particular request message.

In a fourth implementation, alone or in combination with one or more of the first through third implementations, determining whether at least one communication message has a communication message match includes identifying a particular response message, of the set of communication messages, that was sent from a first OT device to a second OT device; identifying one or more request messages, of the set of communication messages, that were sent from the second OT device to the first OT device; and identifying a particular request message, of the one or more request messages, that includes message header information that correlates with message header information of the particular response message; and determining that the particular request message is a communication message match for the particular response message based on identifying the particular request message that includes the message header information that correlates with the message header information of the particular response message.

In a fifth implementation, alone or in combination with one or more of the first through fourth implementations, causing the one or more actions to be performed includes processing, using a machine learning model, the one or more communication entries to identify at least one communication issue affecting a performance of at least one OT device; generating one or more instructions to address the at least one communication issue; and causing the at least one OT device to execute the one or more instructions.

In a sixth implementation, alone or in combination with one or more of the first through fifth implementations, a communication message, of the set of communication messages, is an RFC 1006 TCP telegram, an XML telegram, a raw ethernet telegram, an OPC UA telegram, or an OPC classic telegram.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
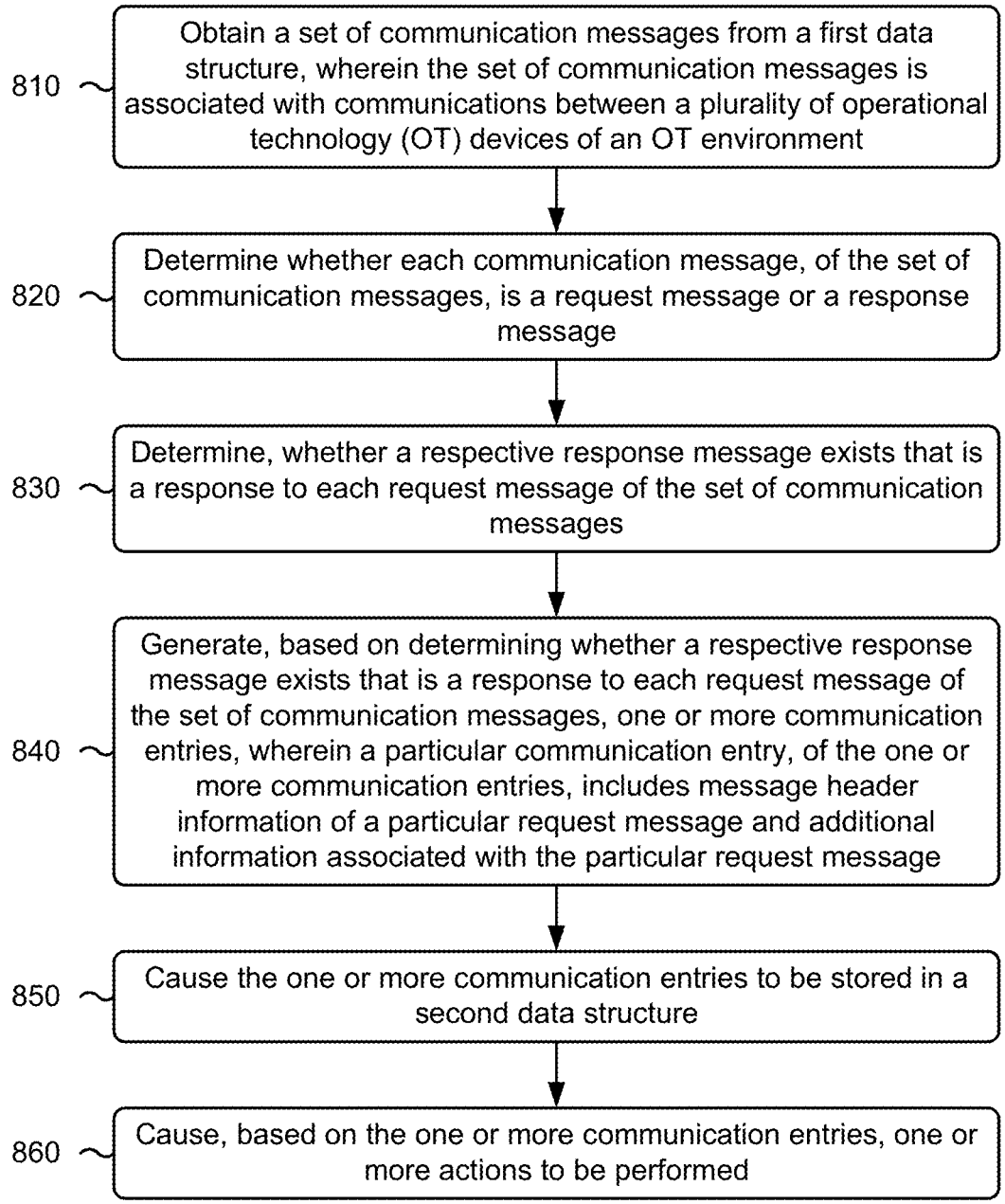

FIG. 8 is a flowchart of an example process 800 for monitoring and analyzing communications across multiple control layers of an OT environment. In some implementations, one or more process blocks of FIG. 8 may be performed by a PCA platform (e.g., PCA platform 420). In some implementations, one or more process blocks of FIG. 8 may be performed by another device or a group of devices separate from or including the PCA platform, such as a client device (e.g., client device 410), an OT device 440, and/or the like.

As shown in FIG. 8, process 800 may include obtaining a set of communication messages from a first data structure, wherein the set of communication messages is associated with communications between a plurality of operational technology (OT) devices of an OT environment (block 810). For example, the PCA platform (e.g., computing resource 424, processor 520, memory 530, storage component 540, input component 550, output component 560, communication interface 570, and/or the like) may obtain a set of communication messages from a first data structure, as described above. In some implementations, the set of communication messages is associated with communications between a plurality of operational technology (OT) devices of an OT environment.

As further shown in FIG. 8, process 800 may include determining whether each communication message, of the set of communication messages, is a request message or a response message (block 820). For example, the PCA platform (e.g., computing resource 424, processor 520, memory 530, storage component 540, input component 550, output component 560, communication interface 570, and/or the like) may determine whether each communication message, of the set of communication messages, is a request message or a response message, as described above.

As further shown in FIG. 8, process 800 may include determining, whether a respective response message exists that is a response to each request message of the set of communication messages (block 830). For example, the PCA platform (e.g., computing resource 424, processor 520, memory 530, storage component 540, input component 550, output component 560, communication interface 570, and/or the like) may determine, whether a respective response message exists that is a response to each request message of the set of communication messages, as described above.

As further shown in FIG. 8, process 800 may include generating, based on determining whether a respective response message exists that is a response to each request message of the set of communication messages, one or more communication entries, wherein a particular communication entry, of the one or more communication entries, includes message header information of a particular request message and additional information associated with the particular request message (block 840). For example, the PCA platform (e.g., computing resource 424, processor 520, memory 530, storage component 540, input component 550, output component 560, communication interface 570, and/or the like) may generate, based on determining whether a respective response message exists that is a response to each request message of the set of communication messages, one or more communication entries, as described above. In some implementations, a particular communication entry, of the one or more communication entries, includes message header information of a particular request message and additional information associated with the particular request message.

As further shown in FIG. 8, process 800 may include causing the one or more communication entries to be stored in a second data structure (block 850). For example, the PCA platform (e.g., computing resource 424, processor 520, memory 530, storage component 540, input component 550, output component 560, communication interface 570, and/or the like) may cause the one or more communication entries to be stored in a second data structure, as described above.

As further shown in FIG. 8, process 800 may include causing, based on the one or more communication entries, one or more actions to be performed (block 860). For example, the PCA platform (e.g., computing resource 424, processor 520, memory 530, storage component 540, input component 550, output component 560, communication interface 570, and/or the like) may cause, based on the one or more communication entries, one or more actions to be performed, as described above.

Process 800 may include additional implementations, such as any single implementation or any combination of implementations described below and/or in connection with one or more other processes described elsewhere herein.

In a first implementation, the additional information associated with particular request message includes at least one of message header information of a particular response message that is a response to the particular request message; a time delay associated with the particular request message and the particular response message; or at least one communication status associated with the request message.

In a second implementation, alone or in combination with the first implementation, causing the one or more actions to be performed includes processing the one or more communication entries to identify a communication issue affecting a performance of at least one OT device; generating one or more instructions to address the communication issues; and causing a display of a client device to display the one or more instructions.

In a third implementation, alone or in combination with one or more of the first and second implementations, causing the one or more actions to be performed includes processing the one or more communication entries to identify a communication issue affecting a performance of at least one OT device; generating a report concerning the communication issue; and sending the report to a client device to cause the report to be displayed.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, a plurality of communication messages,
        wherein the plurality of communication messages is communicated between a plurality of operational technology (OT) devices across a plurality of OT control layers of an OT environment;
    causing, by the device, the plurality of communication messages to be stored in a first data structure;
    identifying, by the device, a set of communication messages stored in the first data structure;
    determining, by the device, whether each communication message, of the set of communication messages, is a request message type or a response message type;
    identifying, by the device and based on determining whether each communication message is the request message type or the response message type, at least one communication message pair,
        wherein a communication message pair, of the at least one communication message pair, comprises a request message and a response message that is a response to the request message;
    determining, by the device, at least one communication status associated with the request message and the response message identifying at least one of:
        a match status,
        a time delay status,
        a warning or error status, or
        a length status;
    generating, by the device and based on identifying the at least one communication message pair, one or more communication entries,
        wherein a communication entry, of the one or more communication entries, includes respective message header information of the request message and the response message that comprise a communication message pair, and
        wherein the communication entry includes the at least one communication status;
    causing, by the device, the one or more communication entries to be stored in a second data structure; and
    causing, by the device and based on the one or more communication entries, one or more actions to be performed.

2. The method of claim 1, wherein receiving the plurality of communication messages comprises:
    receiving the plurality of communication messages from at least one OT device of the plurality of OT devices,
        wherein the at least one OT device includes a capture agent module to capture the plurality of communication messages communicated between the plurality of OT devices across the plurality of OT control layers of the OT environment.

3. The method of claim 1, wherein the communication entry further includes at least one of:
    a time delay associated with the request message and the response message that are included in the communication entry.

4. The method of claim 1, wherein generating the one or more communication entries includes:
    identifying a particular request message and a particular response message that comprise a particular communication message pair of the at least one communication message pair,
    determining, based on the particular request message and the particular response message, a time delay associated with the particular request message and the particular response message, and generating a communication entry that includes message header information of the particular request message, message header information of the particular response message, and the time delay associated with the particular request message and the particular response message.

5. The method of claim 1, wherein generating the one or more communication entries includes:

identifying a particular request message and a particular response message that comprise a particular communication message pair of the at least one communication message pair, generating a communication entry that includes message header information of the particular request message and message header information of the particular response message, determining, based on an event code of the particular request message and an event code of the particular response message, the at least one communication status associated with the particular request message and the particular response message, and causing the at least one communication status to be included in the communication entry.

6. The method of claim 1, wherein a communication message, of the plurality of communication messages, includes message header information and communication data, and wherein the message header information includes at least one of:
information concerning a time of transmission of the communication message,
information identifying a work operation associated with the communication message,
information identifying an origin OT device,
information identifying a destination OT device,
information indicating a name of the communication message,
information indicating an identifier of the communication message,
information indicating a type of the communication message,
information indicating a length of the communication message,
information indicating a running number of the communication message, or
information indicating an event code of the communication message.

7. The method of claim 1, wherein a communication message, of the plurality of communication messages, includes message header information and communication data, and wherein the communication data includes at least one of:
information concerning at least one material used to create a product,
information concerning at least one order to create the product, or
information concerning creation of the product.

8. The method of claim 1, wherein causing the one or more actions to be performed comprises:

sending the one or more communication entries to a client device to cause the one or more communication entries to be displayed.

9. The method of claim 1, wherein causing the one or more actions to be performed comprises:

processing the one or more communication entries to identify a communication issue affecting a performance of at least one OT device, and causing one or more settings associated with the at least one OT device to be adjusted.

10. A device, comprising:
one or more memories; and
one or more processors communicatively coupled to the one or more memories, configured to:
obtain a set of communication messages,
wherein the set of communication messages is associated with communications between a plurality of operational technology (OT) devices across a plurality of OT control layers of an OT environment;
determine whether each communication message, of the set of communication messages, is a request message type or a response message type;
determine, based on determining whether each communication message is the request message type or the response message type, whether at least one communication message has a communication message match;
determine at least one communication status associated with the request message and the response message identifying at least one of:
a match status,
a time delay status,
a warning or error status, or
a length status;
generate, based on determining whether the at least one communication message has a communication match, one or more communication entries,
wherein a communication entry, of the one or more communication entries, includes message header information of a request message of the set of communication messages, and
wherein the communication entry includes the at least one communication status; and
cause, based on the one or more communication entries, one or more actions to be performed.

11. The device of claim 10, wherein the set of communication messages is obtained from a first data structure, and wherein the one or more processors, when causing the one or more actions to be performed, are configured to:
cause the one or more communication entries to be stored in a second data structure,
generate, based on the one or more communication entries, a report, and
send the report to a client device to allow the client device to display the report on a display of the client device.

12. The device of claim 10, wherein the one or more processors, when determining whether the at least one communication message has a communication message match, are configured to:

identify a particular request message, of the set of communication messages, that was sent from a first OT device to a second OT device,
identify one or more response messages, of the set of communication messages, that were sent from the second OT device to the first OT device,
identify a particular response message, of the one or more response messages, that includes message header information that correlates with message header information of the particular request message, and
determine that the particular response message is a communication message match for the particular request message based on identifying the particular response message that includes the message header information that correlates with the message header information of the particular request message.

13. The device of claim 10, wherein the one or more processors, when determining whether at least one communication message has a communication message match, are configured to:
   identify a particular request message, of the set of communication messages, that was sent from a first OT device to a second OT device,
   identify one or more response messages, of the set of communication messages, that were sent from the second OT device to the first OT device, and
   determine that no particular response message, of the one or more response messages, includes message header information that correlates with message header information of the particular request message, and
   determine that the particular request message does not have a communication message match based on determining that no particular response message, of the one or more response messages, includes the message header information that correlates with the message header information of the particular request message.

14. The device of claim 10, wherein the one or more processors, when determining whether at least one communication message has a communication message match, are configured to:
   identify a particular response message, of the set of communication messages, that was sent from a first OT device to a second OT device,
   identify one or more request messages, of the set of communication messages, that were sent from the second OT device to the first OT device, and
   identify a particular request message, of the one or more request messages, that includes message header information that correlates with message header information of the particular response message, and
   determine that the particular request message is a communication message match for the particular response message based on identifying the particular request message that includes the message header information that correlates with the message header information of the particular response message.

15. The device of claim 10, wherein the one or more processors, when causing the one or more actions to be performed, are configured to:
   process, using a machine learning model, the one or more communication entries to identify at least one communication issue affecting a performance of at least one OT device,
   generate one or more instructions to address the at least one communication issue; and
   cause the at least one OT device to execute the one or more instructions.

16. The device of claim 10, wherein a communication message, of the set of communication messages, is a request for comments (RFC) 1006 TCP telegram, an extensible markup language (XML) telegram, a raw ethernet telegram, an open platform communications unified architecture (OPC UA) telegram, or an OPC classic telegram.

17. A non-transitory computer-readable medium storing instructions, the instructions comprising:
   one or more instructions that, when executed by one or more processors, cause the one or more processors to:
      obtain a set of communication messages from a first data structure,
         wherein the set of communication messages is associated with communications between a plurality of operational technology (OT) devices of an OT environment;
      determine whether each communication message, of the set of communication messages, is a request message type or a response message type;
      determine, whether a respective response message exists that is a response to each request message of the set of communication messages;
      determine at least one communication status associated with the request message identifying at least one of:
         a match status,
         a time delay status,
         a warning or error status, or
         a length status;
      generate, based on determining whether a respective response message exists that is a response to each request message of the set of communication messages, one or more communication entries,
         wherein a particular communication entry, of the one or more communication entries, includes message header information of a particular request message and additional information associated with the particular request message, and
         wherein the particular communication entry includes the at least one communication status;
      cause the one or more communication entries to be stored in a second data structure; and
      cause, based on the one or more communication entries, one or more actions to be performed.

18. The non-transitory computer-readable medium of claim 17, wherein the additional information associated with particular request message includes at least one of:
   message header information of a particular response message that is a response to the particular request message, or
   a time delay associated with the particular request message and the particular response message.

19. The non-transitory computer-readable medium of claim 17, wherein the one or more instructions, that cause the one or more processors to cause the one or more actions to be performed, cause the one or more processors to:
   process the one or more communication entries to identify a communication issue affecting a performance of at least one OT device,
   generate one or more instructions to address the communication issues, and
   cause a display of a client device to display the one or more instructions.

20. The non-transitory computer-readable medium of claim 17, wherein the one or more instructions, that cause the one or more processors to cause the one or more actions to be performed, cause the one or more processors to:
   process the one or more communication entries to identify a communication issue affecting a performance of at least one OT device,
   generate a report concerning the communication issue, and
   send the report to a client device to cause the report to be displayed.

* * * * *